Dec. 4, 1934.  A. O. AUSTIN  1,983,334
METHOD OF FORMING INSULATOR CAPS
Filed Aug. 14, 1931   3 Sheets-Sheet 1

INVENTOR
Arthur O. Austin
BY
ATTORNEY

Dec. 4, 1934.                A. O. AUSTIN                1,983,334
METHOD OF FORMING INSULATOR CAPS
Filed Aug. 14, 1931        3 Sheets-Sheet 2

INVENTOR
Arthur O. Austin.
BY
ATTORNEY

Dec. 4, 1934.  A. O. AUSTIN  1,983,334
METHOD OF FORMING INSULATOR CAPS
Filed Aug. 14, 1931  3 Sheets-Sheet 3
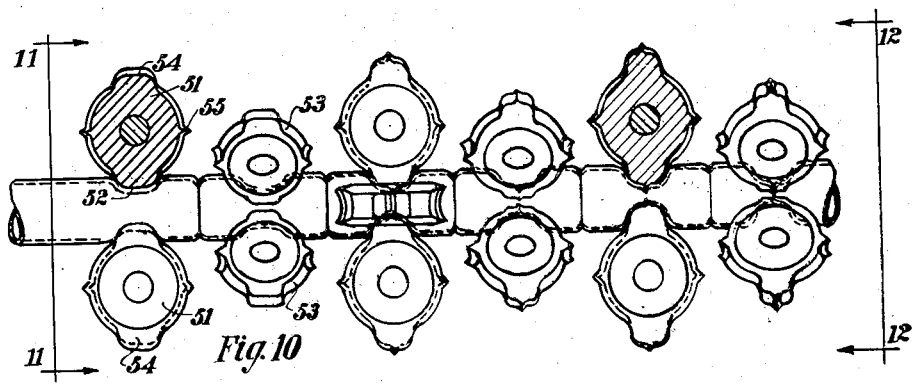
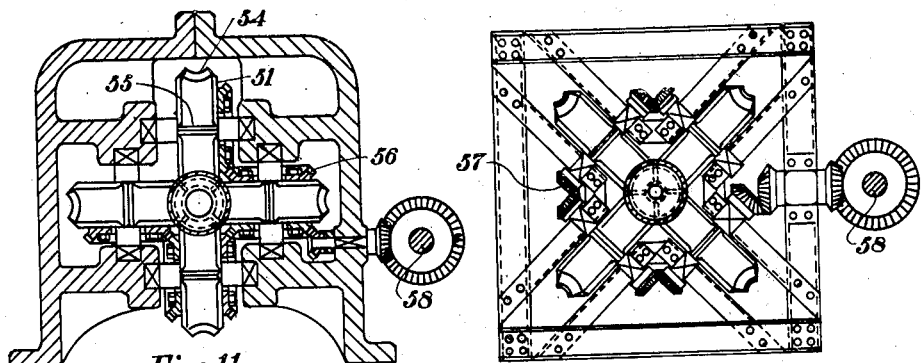
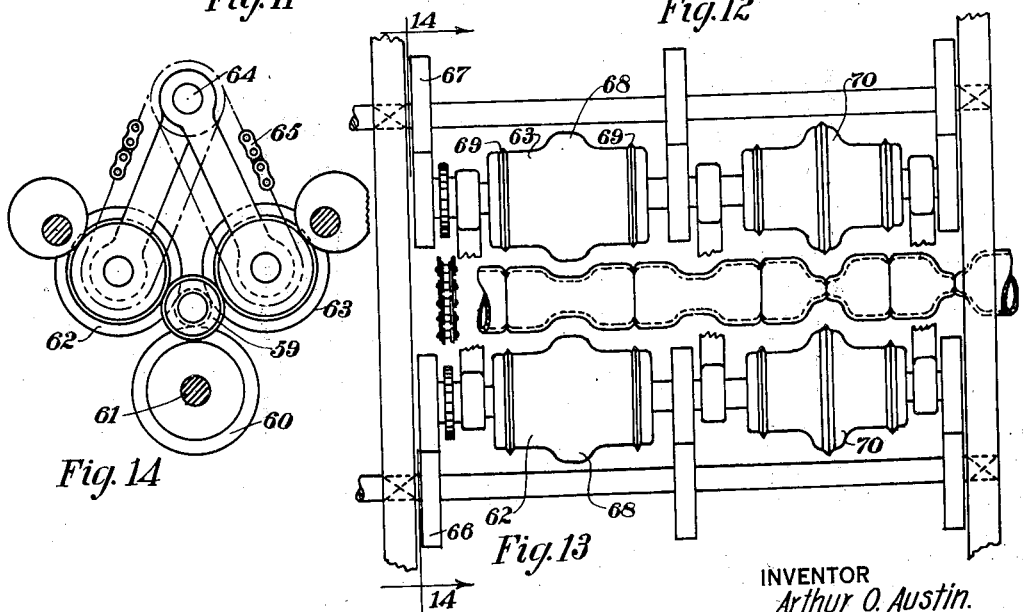
INVENTOR
Arthur O. Austin.
BY
ATTORNEY Patented Dec. 4, 1934

1,983,334

UNITED STATES PATENT OFFICE 1,983,334

METHOD OF FORMING INSULATOR CAPS

Arthur O. Austin, near Barberton, Ohio, assignor, by mesne assignments, to The Ohio Brass Company, Mansfield, Ohio, a corporation of New Jersey Application August 14, 1931, Serial No. 557,018

14 Claims. (Cl. 29—155.52)

This invention relates to forming operations especially applicable to the formation of forged caps for suspension insulators, although it may apply to the production of other devices.

One object of the invention is to provide a method for forming insulator caps which shall be more rapid and economical than forging operations heretofore used for this purpose.

Another object of the invention is to provide a process of forming insulator caps which shall be more nearly continuous in its operation and methods heretofore used.

A further object is to provide a method of forming insulator caps from a tubular piece of stock.

Other objects and advantages will appear from the following description.

The invention is exemplified by the steps of the process illustrated in the accompanying drawings and described in the specification. The invention is more particularly pointed out in the appended claims.

In the drawings:

Fig. 10 is an elevation of a series of rolls for performing the present invention.

Fig. 11 is an elevation on line 11—11 of Fig. 10.

Fig. 12 is an elevation on line 12—12 of Fig. 10.

Fig. 13 is a diagrammatic plan view of a modified form of apparatus for performing the invention.

Fig. 14 is a section on line 14—14 of Fig. 13.

Three methods have heretofore been used for the manufacture of caps for suspension insulators, namely, casting, forging, and sheet metal forming or pressing. For some purposes, the forged cap has certain advantages. The cost of production of forged caps and the limitations as to the design, however, offset their advantages in no small way. With the improved method of making caps provided by the present invention, it is possible to reduce the restrictions heretofore encountered, and in many cases to reduce also the cost of manufacture.

Heretofore, caps have been forged from billets or solid pieces of steel but owing to the thinness and shape of the cap, the wash or abrasion of the dies used in this method is very considerable. The angles of slope or draft are also restrictions or limitations in the forming. With the present method of making caps, however, many of the restrictions and disadvantages heretofore present are materially reduced or eliminated. With the present method of manufacture, it is possible to produce a cap having cylindrical walls without draft where this is desired.

Figure 1:
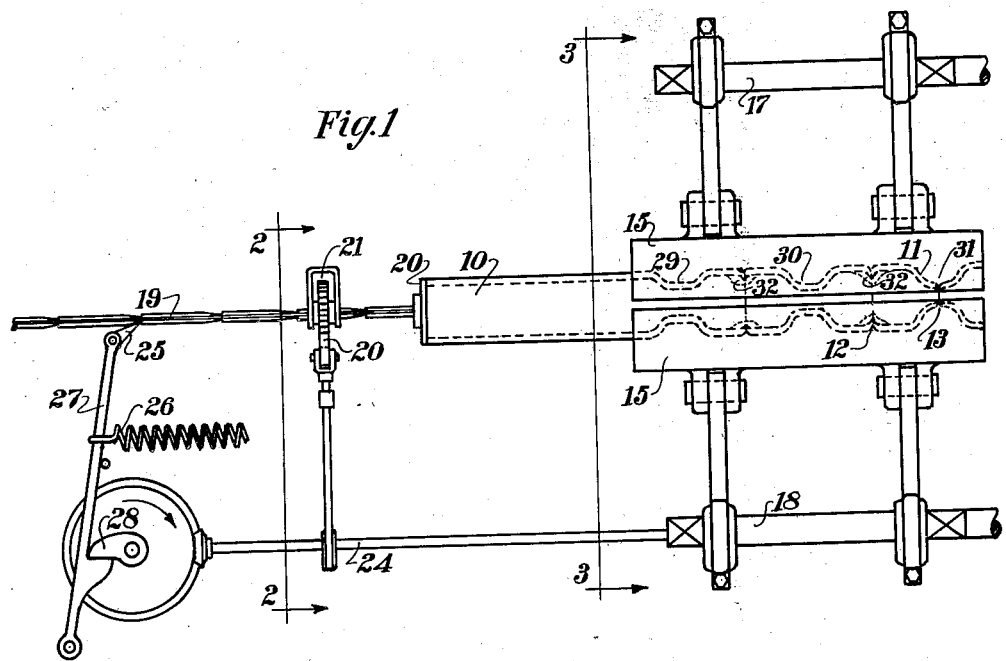
Fig. 1 is a diagrammatic plan view of one form of apparatus for performing the present invention.

In the manufacture of caps according to the present invention, a tubular blank 10, Fig. 1, is used to start the forming operation in place of a solid piece of metal. Several methods are available for treating the tubular blank, which may be a piece of pipe or seamless tubing.

In the species of the invention illustrated in Fig. 1, the tube is swaged by successive steps to the form shown by the dotted lines 11. Any convenient operation may be used for closing in the tubular member to the desired size. The member may then be cut off along the lines 12 and 13. The tubular member is closed in at 13 to form the top of the cap and turned in at 12 to form a shoulder for the bearing of the cement which holds the cap to the dielectric member. In some cases it may be advantageous to swage the rims in at 12 after the parts have been severed at this point instead of before.

Figure 4:
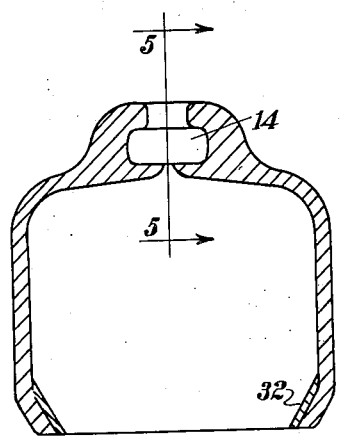
Fig. 4 is a section of a finished cap made according to the present invention.
Figure 5:
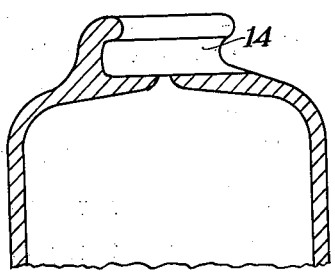
Fig. 5 is a section on line 5—5 of Fig. 4.

If desired, the tapered section may be reformed in a die, under a drop hammer or press, so as to further change the shape providing the internal forming member does not exceed in size the opening at the line 12. If the parts are separated before they are turned in at 12, the reforming die may fill the entire cap and the rim be turned in after re-forming. The severed member may be provided with a slot 14 to form the T shaped opening for ball and socket connection as shown in Figs. 4 and 5.

The swaging or contracting operation for the end of the cap thickens the metal where needed for resisting the spreading action of the supporting ball under longitudinal stress. In general, where the work is heavy the material will be heated. In some cases, however, part of the forming operation may be made on cold material.

Figure 2:
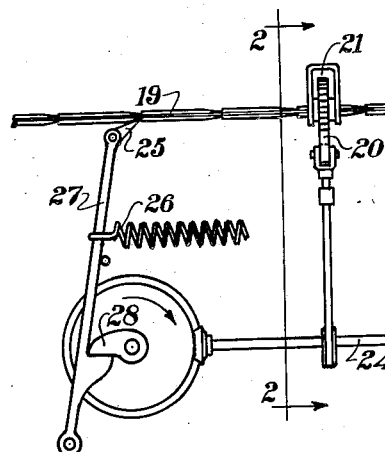
Fig. 2 is a section on line 2—2 of Fig. 1.
Figure 3:
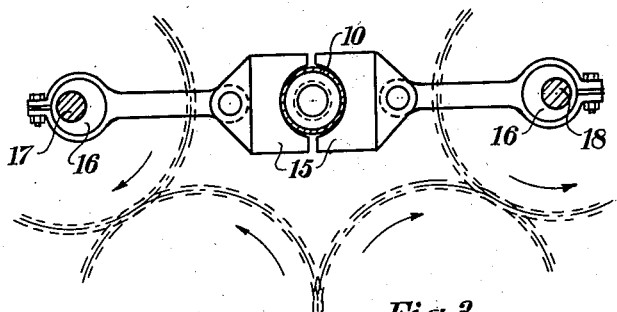
Fig. 3 is a section on line 3—3 of Fig. 1.

Any convenient mechanism may be employed for swaging or forming the caps from the tubular stock. In the apparatus illustrated in Figs. 1, 2 and 3, a pair of dies 15 are shaped to perform separate stages of the forming operation on the stock 10. The dies 15 are moved in and out by eccentrics 16 on shafts 17 and 18. The stock 10 is given a partial rotation after each operation of the dies, so that the stock will be uniformly compressed. The rotation is effected by a shaft 19 attached to the end of the stock 10 by a plate 20. The shaft 19 has a ratchet wheel 21 splined thereon which is operated by a pawl 22 connected with an eccentric 23 on a continuation 24 of the shaft 18.

After a series of operations of the dies 15 in one position of the stock 10, the stock is fed forwardly by an amount equal to the length of two of the caps so as to bring the stock in position for a subsequent operation by each die. The forward movement of the stock is effected by a pawl 25 actuated by a spring 26. The pawl 25 is carried on an arm 27 which is moved backwardly against the tension of the spring 26 by a cam 28 driven from the shaft 24. The driving parts are so timed that after the required number of operations in one position, the arm 27 will be released by the cam 28 and the rod 19 will be moved forward quickly during separation of the dies 15. The portion of the dies which first engages the stock 10 partially reduces the stock as shown at 29. A further reduction occurs at 30 and the final reduction takes place at 31. The compression of the stock thickens the wall and provides the necessary strength for withstanding the spreading action on the T shaped slot 14, as explained above.

With this process, it is possible to place reinforcing sections or rings 32 inside of the tubular member. The band 32 is equally divided at each side of the line 12 of reduction so that there will be little if any tendency for the band to creep, and the difficulty in holding the piece in the proper position will be reduced to a minimum. The piece 32 may be of any desired form, and may be pre-formed to approximately its final shape or it may be in cylindrical form and forced in with the outside case.

The method is adaptable to high speed continuous forming, particularly where the material needs but little heat or where the material can be heated during the process.

In the ordinary forging operation a considerable part of the cost and time required is occasioned by the heating. In the present process this part of the operation can be materially reduced by the use of electric current to heat the member during the process of forming. The current may be caused to flow over the entire member by means of a special transformer and the operations may be performed at different points, or if desired separate contact members for the different points of operation may be connected to terminals which will transmit current of the amount necessary to provide the desired heat for the several operations.

Figure 6:
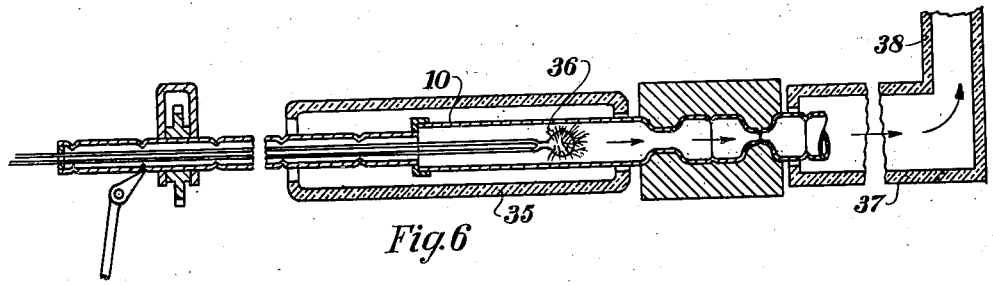
Fig. 6 is a diagrammatic, vertical section of one form of heating apparatus used in connection with the present invention.
Figure 7:
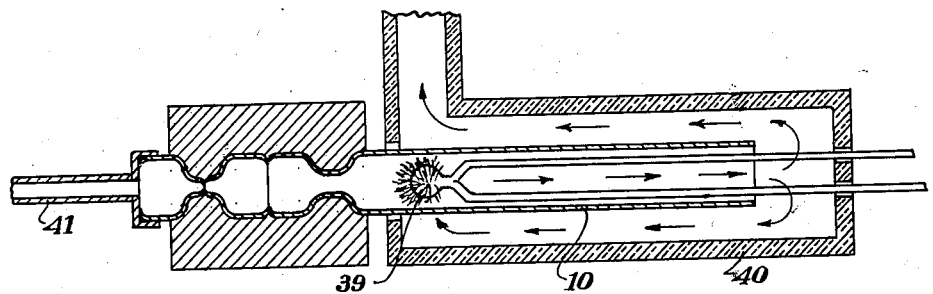
Fig. 7 is a view similar to Fig. 6 showing another form of heating apparatus.

Apparatus for performing another method of heating to permit continuous operation is shown in Fig. 6 in which the tubular member 10, to be treated, enters a heating chamber 35 which may be heated either electrically or by gas. The tubular member 10 encloses a suitable burner 36. The flow of burning gas or highly pre-heated air being outward in the tubular member 10, the gases of combustion or the pre-heated air may then be taken off by a suitable collecting member 37 with stack 38. It will be seen that the passage of gases of combustion or the highly pre-heated air will tend to maintain the forging temperature of the tubular member. This, together with the heat produced by the work in forming the piece rapidly by dies 15 or other suitable means will tend to maintain the desired temperature and reduce the necessity of re-heating.

Where the forging operation is such as to so restrict the hole in the tube that gas cannot pass to the collector 37, an arrangement shown in Fig. 7 may be used in which the burner 39 is advanced as near as possible to the forming position; the path of the gas then being back along the inside of the member 10, as shown by the arrows. With this type of construction, the hot gases may be used to traverse not only the inside but the outside of the tube as well. In starting, the tubular member 10 is placed well back in the heating chamber 40, the path of the hot gases being shown by the arrows. The means 41 used for locating the tubular member at the proper position is also used to close the end of the tubular member. In the forming operation the equipment and apparatus is so located and arranged that radiation can be reduced by proper jacking of the heat by insulating members where the separation between the operations is such as to permit cooling.

Figure 8:
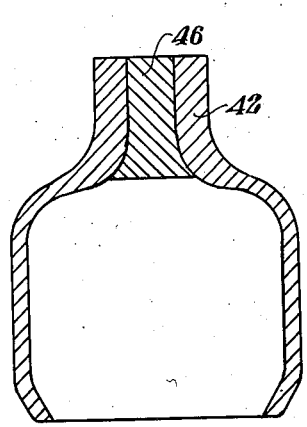
Fig. 8 is a section of a partially formed cap made by the present invention.
Figure 9:
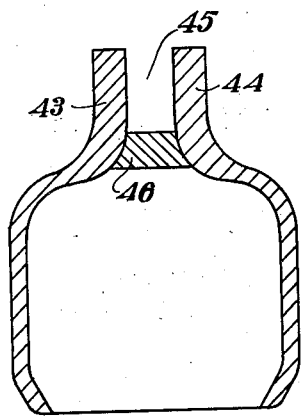
Fig. 9 is a section of a slightly different form of cap.

The method is suitable for forming many types of caps in addition to suspension insulator caps of the ball and socket type. In place of the socket recess in the cap shown in Figs. 4 and 5, the metal may be so formed during the contracting operation as to provide a neck 42, Fig. 8, that may be later split and readily formed into ears for a clevis cap. The formed member having the neck 41 may be punched or drifted, as shown in Fig. 9, so as to form two strips or ears 43 and 44. The slot 45 may then be cut in any convenient way.

The neck portion 42 may have a square or rectangular section if desired. This may be produced in any of the usual ways, which will greatly simplify the final operation in Fig. 9. If desired, a mandrel may be placed in the opening during the forming of the neck portion 42. The closing piece 46 may be welded or crimped into position.

If desired, a metal plug 46 may be used to close the opening during the necking operation. This member may extend entirely through the neck 42; the unused portion being removed by the slotting operation.

With this method of forming, it is possible to have ears on the caps which have parallel sides. This gives the full thickness and strength above the holes in the ears which is a decided advantage over caps as heretofore made by the forging operation, as the necessity of providing draft produces thin ears where the strength is most needed. The parallel surfaces also make the fit with rivets or bolts much better.

In the ball and socket type, it is possible to close the opening by a disc or to use a filler plug extending through the restricted portion which will be forged into shape. The usual method of forming the socket by milling or cutting can then be used for finishing.

By providing the filler plug with the proper roughening on its surface or holding it in proper position while the outer wall is being contracted, the end of the cap may be effectively closed off. Where the plug is at a lower temperature than the outside member, the contraction of the outer wall will tend to further insure tightness even though the temperatures are not sufficient to produce welding. Any slight pin hole or opening will be closed by the galvanizing operation. In some types of caps, it is not necessary to close the opening at the end. The invention, however, provides easy means of forming the caps over a range of shapes which is impractical under the usual forging methods.

Following the forming operations of the blanks, the caps may be readily finished in chucking machines or turret lathes, or by any of the methods now in vogue. The possibility of the practically continuous forming operation without limitation as to draft or the necessity of maintaining very high temperatures, or the reheating of the blanks, makes it possible to form an improved cap and at a reduced cost.

Figs. 10, 11 and 12 illustrate a further form of apparatus for practicing the invention. With this apparatus the tubular member 50 is first heated and then fed longitudinally through a series of rolls which form the tube into shapes such that when they are separated the shapes will constitute insulator caps. The first set of rolls 51 to which the tube 50 is subjected consists of four rolls having their axes of rotation at right angles to the axis of the tubes, and these rolls form a depression in the tube as shown at 52. The next set of rolls 53 are duplicates of the rolls 51 but are set at an angle of 45° to the rolls 51. The operating surfaces of these two sets of rolls are illustrated more clearly by the rolls 51 in Fig. 10 where it is seen that the rolls are provided with two sets of projections 54 and 55. The projections 54 compress the tube, helping to form the neck portion between two caps while the projections 55 form a less marked depression about the tube which provides the turned-in rim at the lower edge of the cap. The sets of rolls are properly spaced so that the depressions formed by corresponding projections on the various sets will register with the depressions formed by the other sets, so that as the tube is fed forward the depressions will be made progressively deeper due to progressively increased projections on the rolls.

In the apparatus illustrated, the operation is performed in three successive steps and two sets of rolls are provided for each step; the sets of rolls for any one step being displaced at 45°. It will be understood, of course, that the operating surfaces of the rolls are grooved like a pulley so as to fit about a portion of the circumference of the pipe.

The rolls of each set are geared together by suitable gearing, as shown at 56 in Fig. 11 and 57 in Fig. 12, and all the rolls are driven in unison by a drive shaft 58. It will be understood that the number of rolls employed may be changed to adapt the mechanism to pipe of various size and character and that other modifications may be made in the apparatus which will readily suggest themselves to those skilled in the art.

In Figs. 13 and 14, apparatus is shown for rolling the pipes by means of rolls acting circumferentially upon the stock. In these figures the tube from which the caps is formed is shown at 59. A number of sets of rolls may be used and each set may comprise various numbers of rolls. In the apparatus shown two sets of rolls are shown, each consisting of three rolls. The lower rolls 60 may be mounted on a shaft 61 to rotate about a fixed axis. The rolls 62 and 63 are swung from a shaft 64 and driven by chains 65 or other suitable means. The rolls 62 and 63 are pressed inwardly by cams 66 and 67. The rolls 60 may of course be driven. Also, in some cases, it is only necessary to drive one or two of the rolls. As the rolls 62 and 63 are pressed inwardly by the cams 66 and 67, the projections 68 and 69 on these rolls will form corresponding depressions on the stock. The stock will then be fed to the right, as shown in Fig. 12 and the next set of rollers having larger projections 70 will complete the formation of the caps. It will be seen that with this apparatus the stock will be fed through continuously by periodic steps and will be rolled into cap form.

I claim:

1. The method of manufacturing insulator caps comprising the steps of severing from a tubular blank sections, each of proper length to form a cap and closing one end of each severed section and forming a supporting attachment on the closed end.

2. The method of forming insulator caps comprising the steps of compressing a tubular blank at spaced positions therealong to form a series of restricted necks and severing said blank thus formed at adjacent neck portions and between said adjacent neck portions to provide formed or partially formed caps of cup shaped formation.

3. The process of forming insulator caps from a tubular blank comprising the steps of subjecting said blank at spaced points thereon, successively, to different formers and compressing said blank in successive steps at said spaced points to impart a cup shape to portions of said blank, and severing said cup shaped portions from one another to produce formed or partially formed caps.

4. The method of forming an insulator cap comprising the steps of radially compressing a portion of a tubular blank to provide a transverse wall forming a support, and thereafter severing said blank at a position spaced away from said support to provide a cap body between said support and the severed position thus forming a cup shaped member open at one end and at least partially closed at the other by said wall.

5. The method of forming an insulator cap comprising the steps of radially compressing a tubular blank in successive steps and thus forming a portion of said blank into a cup shaped member having a supporting neck at the compressed end of the cup shaped member, and machining the neck to provide means for engaging a support for the cap.

6. The method of forming insulator caps comprising the steps of compressing a tubular blank at spaced positions thereon sufficiently to close the major portion of the opening through said blank to provide supporting necks for the caps and compressing the blank to a less extent between the neck forming portions to provide inturned flanges at the rims of the caps.

7. The method of forming insulator caps comprising the steps of compressing a tubular blank simultaneously at a plurality of positions along the length thereof to impart cup shaped sections to said blank, and feeding the blank longitudinally to bring different portions thereof successively into forming positions, the total compression at any one portion of said blank being effected in successive steps, each step being performed at a different station from the preceding steps.

8. The method of forming insulator caps comprising the steps of passing a tubular blank between dies, reciprocating the dies toward and away from each other to compress the blank between the dies, rotating the blank to bring different portions of the blank in contact with the dies, feeding the blank longitudinally to bring a given part thereof into cooperative relation with different portions of the dies, the dies being shaped to form the blank into cap shaped sections, and severing the sections to provide insulator caps.

9. The method of forming insulator caps comprising the steps of compressing a tubular blank to shape said blank into cup shaped portions having reduced necks and turned in edges severing said blank to separate said cup shaped portions, and machining the necks to provide supporting portions for the caps.

10. The method of forming insulator caps comprising the steps of inserting a tubular blank between rolls arranged to rotate about axes parallel to the axis of the blank, driving the rolls and pressing the rolls against the blank to shape the blank into cup shaped portions and severing the cup shaped portions from one another.

11. The method of forming insulator caps comprising the steps of inserting a tubular blank between a plurality of sets of axially aligned rolls having different conformation, pressing the different sets of rolls simultaneously against different portions of the blank respectively to compress the blank, withdrawing the rolls and feeding the blank longitudinally while the rolls are withdrawn to bring portions thereof successively into engagement with different rolls.

12. The method of forming insulator caps comprising the steps of positioning a filler within the interior of a tubular blank and compressing the blank upon a reduced intermediate portion of said filler and severing the blank and filler at said reduced portion.

13. The method of forming insulator caps comprising the steps of placing a filler within a tubular blank, compressing the blank upon said filler to form a neck portion between larger portions of said blank and filler, severing said neck portion, and machining the neck portion to provide a support for the cap.

14. The method of forming insulator caps comprising the steps of inserting a ring within the interior of a tubular blank with the axis of the ring and blank extending in the same direction, compressing the blank against the ring and severing the blank adjacent the ring to leave a portion of the ring within the cap.

ARTHUR O. AUSTIN.